United States Patent
Sajayan et al.

(10) Patent No.: US 8,301,928 B2
(45) Date of Patent: Oct. 30, 2012

(54) AUTOMATIC WAKEUP HANDLING ON ACCESS IN SHARED MEMORY CONTROLLER

(75) Inventors: Sajish Sajayan, C.V. Raman Nagar (IN); Alok Anand, Bangalore (IN); Joseph R. Zbiciak, Arlington, TX (US)

(73) Assignee: Texas Instruments Incorporated, Dallas, TX (US)

( * ) Notice: Subject to any disclaimer, the term of this patent is extended or adjusted under 35 U.S.C. 154(b) by 813 days.

(21) Appl. No.: 12/356,294

(22) Filed: Jan. 20, 2009

(65) Prior Publication Data
US 2009/0249106 A1 Oct. 1, 2009

Related U.S. Application Data

(60) Provisional application No. 61/022,008, filed on Jan. 18, 2008.

(51) Int. Cl.
*G06F 1/00* (2006.01)
(52) U.S. Cl. ......... 713/324; 713/300; 713/320; 711/118
(58) Field of Classification Search .......... 713/300, 713/320, 324; 711/118
See application file for complete search history.

(56) References Cited

U.S. PATENT DOCUMENTS

| | | | | |
|---|---|---|---|---|
| 5,615,162 A * | 3/1997 | Houston | | 365/226 |
| 5,781,783 A * | 7/1998 | Gunther et al. | | 713/320 |
| 6,079,023 A * | 6/2000 | Yoon et al. | | 713/300 |
| 6,442,667 B1 * | 8/2002 | Shiell et al. | | 711/207 |
| 6,845,432 B2 * | 1/2005 | Maiyuran et al. | | 711/154 |
| 7,136,984 B2 * | 11/2006 | Maiyuran et al. | | 711/173 |
| 7,165,165 B2 * | 1/2007 | Woodbridge et al. | | 711/219 |
| 7,216,250 B2 * | 5/2007 | Matsuoka et al. | | 713/503 |
| 7,360,023 B2 * | 4/2008 | Goodrich | | 711/128 |
| 7,443,759 B1 * | 10/2008 | Rowlands et al. | | 365/227 |
| 7,457,917 B2 * | 11/2008 | Damaraju et al. | | 711/118 |
| 7,487,369 B1 * | 2/2009 | Gupta et al. | | 713/300 |
| 7,562,191 B2 * | 7/2009 | Knoth | | 711/128 |
| 7,657,708 B2 * | 2/2010 | Knoth et al. | | 711/128 |
| 7,663,961 B1 * | 2/2010 | Rowlands et al. | | 365/227 |
| 7,796,458 B2 * | 9/2010 | Rao | | 365/226 |
| 7,802,060 B2 * | 9/2010 | Hildebrand | | 711/154 |
| 7,904,658 B2 * | 3/2011 | Abadeer et al. | | 711/128 |
| 8,069,354 B2 * | 11/2011 | Min | | 713/300 |
| 2002/0103977 A1 * | 8/2002 | Ewoldt | | 711/140 |
| 2004/0128445 A1 * | 7/2004 | Israeli et al. | | 711/129 |
| 2005/0097277 A1 * | 5/2005 | Maiyuran et al. | | 711/128 |
| 2005/0210206 A1 * | 9/2005 | Woodbridge et al. | | 711/154 |
| 2006/0117160 A1 * | 6/2006 | Jackson et al. | | 711/170 |
| 2006/0143382 A1 * | 6/2006 | Damaraju et al. | | 711/118 |
| 2007/0022260 A1 * | 1/2007 | Flautner et al. | | 711/156 |

* cited by examiner

*Primary Examiner* — Jaweed A Abbaszadeh
(74) *Attorney, Agent, or Firm* — Robert D. Marshall, Jr.; Wade James Brady, III; Frederick J. Telecky, Jr.

(57) ABSTRACT

A hardware based wake-up scheme initiates memory power-up upon a normal access to a powered down memory. The access that triggered the power-up is buffered. Further accesses are stalled until the memory is completely powered up. The buffered access then proceeds to the memory and the processor is brought out of stall. In cases where the software does not directly control access to the memory, such as on a cache miss, this scheme avoids undesirable conditions due to access to powered down memories.

3 Claims, 2 Drawing Sheets

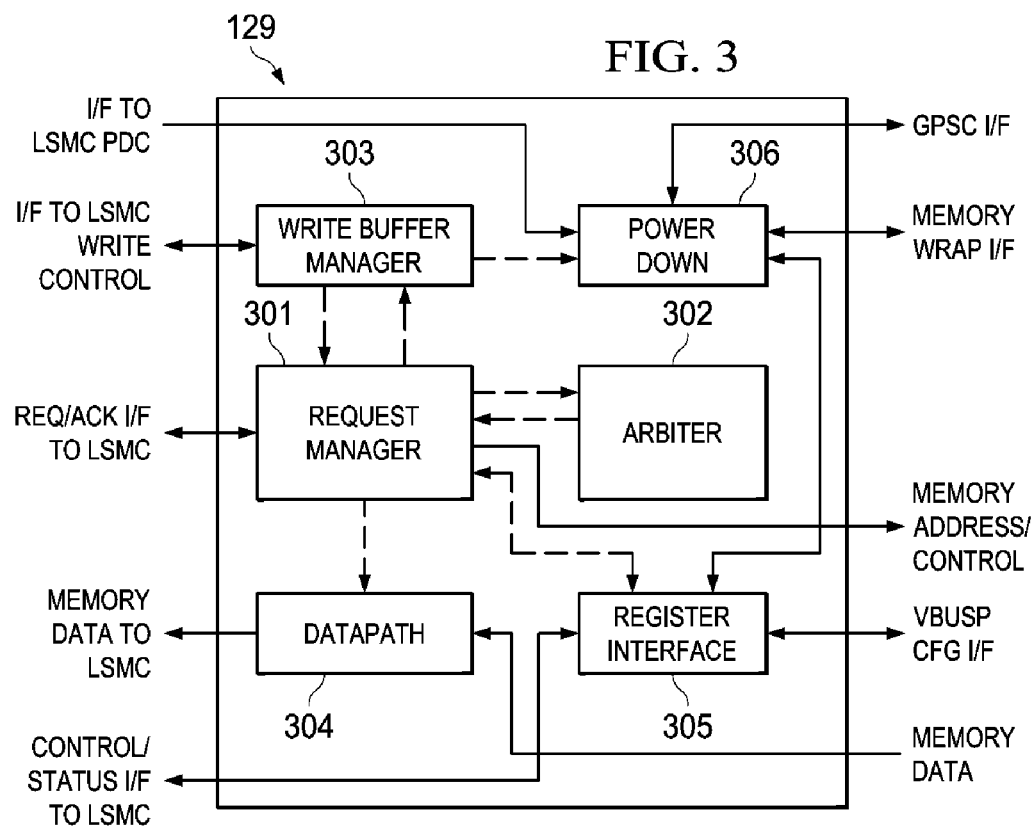
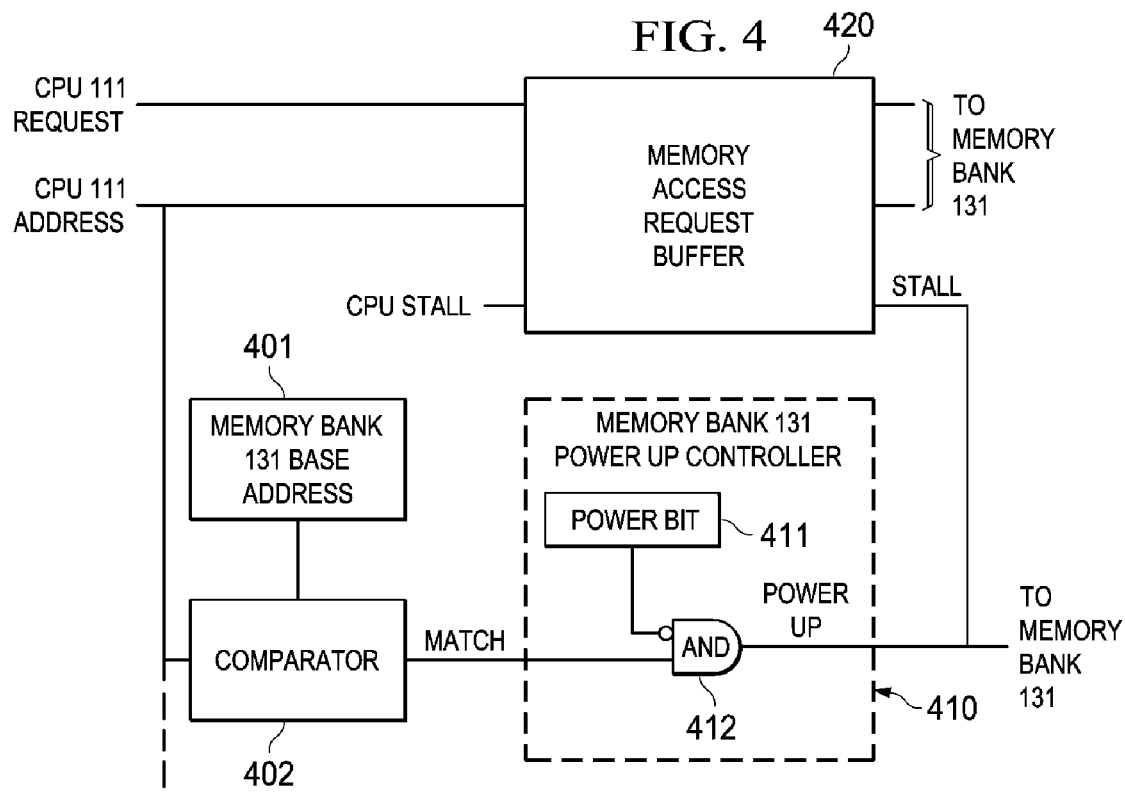

AUTOMATIC WAKEUP HANDLING ON ACCESS IN SHARED MEMORY CONTROLLER

CLAIM OF PRIORITY

This application claims priority under 35 U.S.C. 119(e)(1) to U.S. Provisional Application No. 61/022,008 filed Jan. 18, 2008.

TECHNICAL FIELD OF THE INVENTION

The technical field of this invention is power controlling shared memories in a multiprocessor system.

BACKGROUND OF THE INVENTION

SRAM memories in advanced technology nodes consume significant amount of leakage power. Powering down memories when not in use for long periods is one of the methods used to reduce overall power consumption in a system on a chip (SOC). The memories will be powered up when the system requires the memories to be accessed. Before accessing a powered down memory, a wakeup request must be sent to power up the memory. The access cannot be made until the memory is completely powered up. This is conventionally accomplished by delaying the actual access in software for a predefined time or till the completion of wakeup is signaled through some means such as an interrupt or polling a status register. In cases where the software does not directly control access to the memories, such as a cache miss, the software must not make any access that will result in an access to powered down memory. Thus additional software overhead or limitations are incurred in accessing a powered down memory.

SUMMARY OF THE INVENTION

This invention is a hardware based wake-up scheme. Memory power-up is initiated by a normal access to the powered down memory. The memory controller checks if an access to the memory from a master is to a powered down bank/row of memory. If so, the memory controller initiates a power-up of the memory by signaling the power management controller. The access that triggered the power-up is buffered. Further accesses are stalled until the memory is completely powered up and the power management controller signals the memory controller. The buffered access then proceeds to the memory. The master interface is brought out of stall permitting further access requests by the master.

This hardware based solution for handling wake-up of powered down memories is fast due to absence of software overhead in powering up memories and waiting for the completion of power up before an access is initiated. An access itself initiates the power-up. In cases where the software does not directly control access to the memory, such as on a cache miss, this scheme avoids undesirable conditions due to access to powered down memories. The management of wakeup of memories is offloaded from software to hardware.

BRIEF DESCRIPTION OF THE DRAWINGS

These and other aspects of this invention are illustrated in the drawings, in which:

FIG. 3 is a block diagram of the central shared memory controller of the multiprocessor system; and FIG. 4 is a block diagram of the power controller portion of the this invention.

DETAILED DESCRIPTION OF PREFERRED EMBODIMENTS

Figure 1:
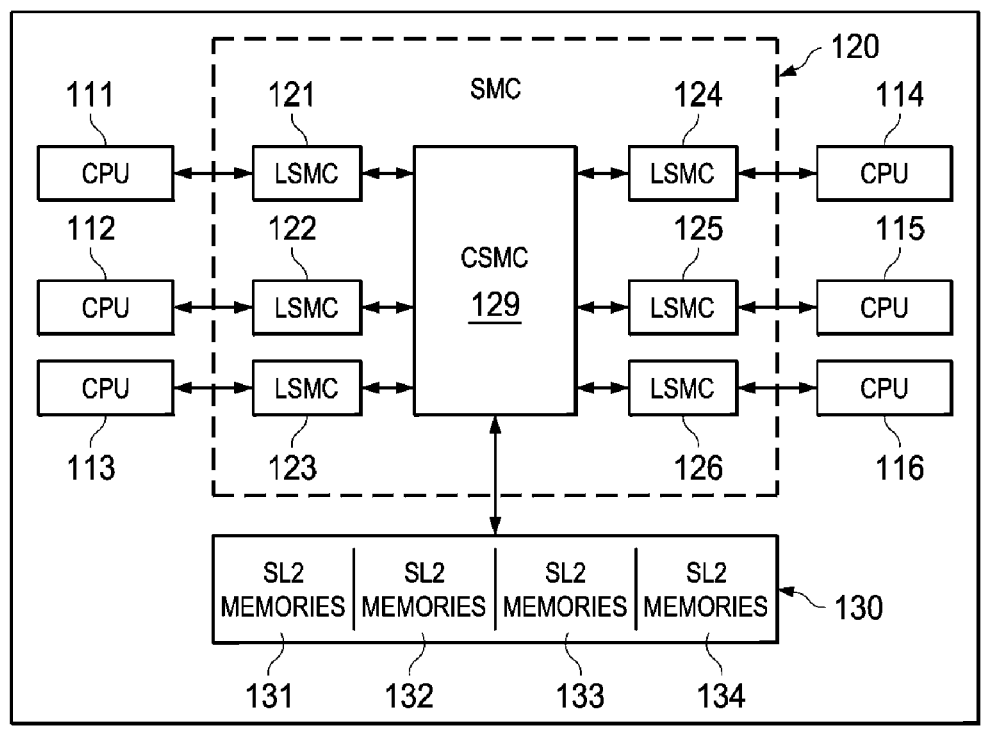
FIG. 1 is a block diagram of a multiprocessor system integrated circuit using shared memory.

This invention is useful in a multiprocessor integrated circuit such as illustrated in FIG. 1. Example multiprocessor integrated circuit 100 includes: six central processing units 111, 112, 113, 114, 115 and 116; a shared memory controller 120 including six local shared memory controllers 121, 122, 123, 124, 125 and 126 connected to corresponding central processing units and central shared memory controller 129; and shared memory 130 including separately energizable memory banks 131, 132, 133 and 134. Multiprocessor integrated circuit 100 includes plural central processing units sharing a common memory. Note the number of central processing units and memory banks shown in FIG. 1 is exemplary only. This architecture creates problems solved by this invention.

Each of the central processing units 111 to 116 is a stand-alone programmable data processor. In the preferred embodiment these have the same instruction set architecture (ISA). This is known as homogenous multiprocessing. However, this invention is also applicable to heterogeneous multiprocessing in which the central processing unit employ two or more ISAs. Each central processor preferably includes a processing core for data processing operations, a data register file for temporary storage of operand data and results data and instruction and data cache. Each central processing unit operates under its own program. Each central processing unit uses shared memory controller 120 to access programs and data in shared memory 130.

Shared memory controller (SMC) 120 interfaces central processing units 111, 112, 113, 114, 115 and 116 to shared memory 130. In the preferred embodiment shared memory 130 is at the same level in the memory hierarchy as second level (L2) cache in central processing units 111, 112, 113, 114, 115 and 116. SMC 120 includes: Local SMC (LSMC) and Central SMC (CSMC). This partition is done to keep the GEM specific logic in the LSMC and the memory bank specific logic in the CSMC.

Figure 2:
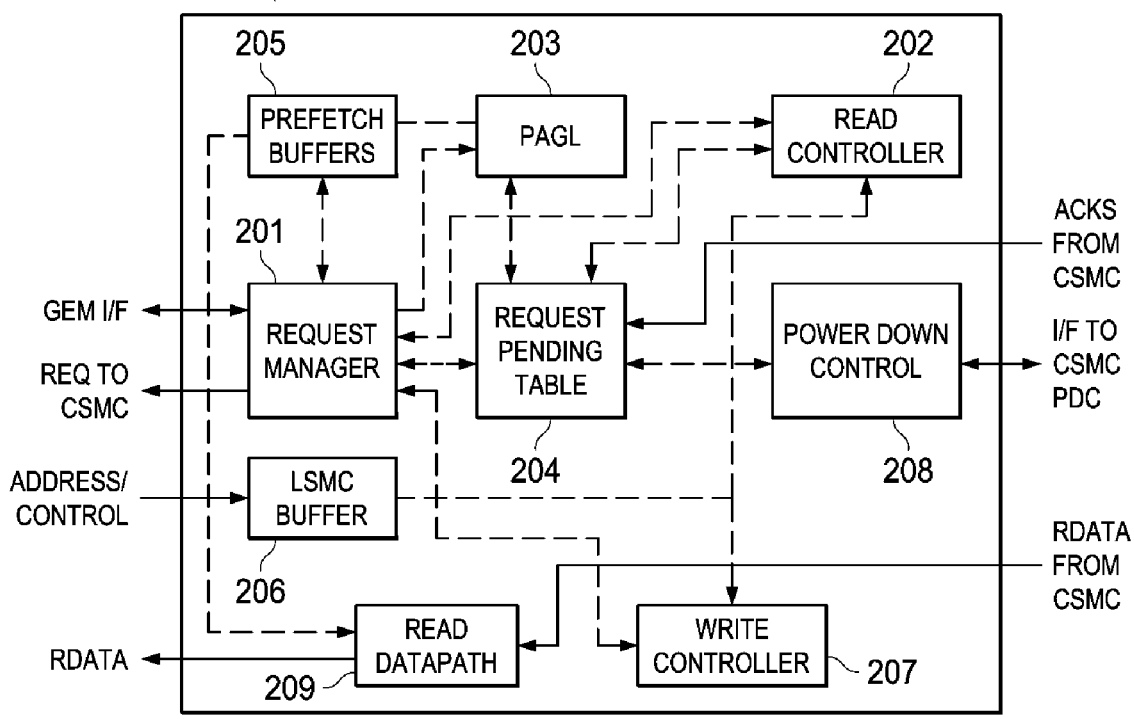
FIG. 2 is a block diagram of the local shared memory controller corresponding to one of the processors of the multiprocessor system.

FIG. 2 illustrates an exemplary local shared memory controller 121. LSMC 121 includes: request manager 201; read controller 202; prefetch access generation logic (PAGL) 203; request pending table 204; prefetch buffers 205; LSMC buffer 206; write controller 207; power down controller 208; and read datapath 209.

Request manager 201 interfaces with the corresponding CPU interface. Request manager 201 decodes the requests from CPU 111 and controls the different blocks with in LSMC 121. Request manager 201 handles the lookup of the prefetch buffers and figures out if a CPU 111 access hits or misses the prefetch buffers. Request manager 201 generates a system ready signal taking individual components of ready from read controller 202 and write controller 209. Request manager 210 controls read datapath 209 to CPU 111. Request manager 121 submits the read requests and prefetch requests to CSMC 129.

Read controller 202 manages all the read requests that go to memory banks 131, 132, 133 and 134. Read controller 202 contains per bank state machines that submit read requests to CSMC 129. Read controller 202 contains logic to stall CPU 111 using the cready signal.

Prefetch access generation logic 203 generates the prefetch requests to CSMC 129 to fill prefetch buffers 205. PAGL 203 calculates the addresses to be prefetched based on the type of access by CPU 111. Request manager 201 controls PAGL 203 when killing or aborting a prefetch request.

Request pending table 204 maintains the status of access requests and prefetch requests. Request pending table 204 splits incoming acknowledge signals from CSMC 129 for requests sent from LSMC 121 into real access and prefetch acknowledgments. Real access acknowledgments are routed to CPU 111 and read controller 202. Prefetch acknowledgments are routed to prefetch buffers 205. Request pending table 204 includes a number of entries direct mapping the number of logical memory banks 131, 132, 133 and 134.

Prefetch buffers 205 include data buffers with each logical memory bank 131, 132, 133 and 134. Thus the preferred embodiment includes four data buffers. Prefetch buffers 205 store prefetched data and address tags. Whenever a stored address tag matches the address of an access on the CPU interface and the prefetch data is valid, this data is directly forwarded from prefetch buffers 205 to CPU 111 without fetching from memory.

LSMC buffer 206 is a per-CPU command register which buffers the address and control signals on every access from the CPU. In the case of a write access, LSMC buffer 206 also buffers the write data.

Write controller 207 handles write requests from CPU 111. Writes use a token-based protocol. CSMC 129 has 4 per-bank write buffers. Writes from all CPUs arbitrate for a write token to write into the per-bank write buffers. Write controller 207 handles the token request interface with CSMC 129.

Power down controller 208 communicates with its counterpart in CSMC 129. Whenever the CSMC 129 power down controller requests a sleep or wakeup, power down controller 208 ensures that LSMC 121 is in a clean state before allowing the CSMC 129 power down controller to proceed.

Read datapath 209 receives control signals from request manager 201 corresponding to the type of access. Read datapath 209 multiplexes data from either prefetch buffer 205 or the memory data from CSMC 129 which is registered and forwarded to CPU 111.

FIG. 3 illustrates an exemplary central shared memory controller 129. Central shared memory controller (CSMC) 129 includes: request manager 301; arbiter 302; write buffer manager 303; datapath 304; register interface 305; and power down controller 306.

Request manager 301 receives requests from all CPUs 111 to 116. Request manager 301 submits these requests to a corresponding per-bank arbiter. Request manager 301 generates the memory control signals based on the signals from the CPU which won the arbitration. Request manager 301 contains the atomic access monitors which manage atomic operations initiated by a CPU.

Arbiter 302 is a least recently used (LRU) based arbiter. Arbiter 302 arbitrates among requests from all six CPUs for each memory bank 131, 132, 133 and 134. Arbitration uses the following priority. Write requests have the highest priority. Only one write request will be pending to any particular bank at a time. Real read requests have the next lower priority. A real read request is selected only if there are no pending write requests from any CPU. Prefetch requests have the lowest priority. Prefetch requests are selected only if there are no write requests or real read requests from any CPU.

Among CPUs requesting access at the same priority level, arbiter 302 implements a standard LRU scheme. Arbiter 302 has a 6 bit queue with one entry per CPU in each queue. The head of the queue is always the LRU. If the requester is the LRU, then it automatically wins the arbitration. If the requester is not the LRU, then the next in the queue is checked and so on. The winner of a current arbitration is pushed to the end of the queue becoming the most recently used. All other queue entries are pushed up accordingly.

Write buffer manager 303 contains per-bank write buffers. Write buffer manager 303 interfaces with the token requests from a write controller 207 of one of the LSMCs 121 to 126. Token arbitration uses a LRU scheme. Each per-bank write buffer of write buffer manager includes six finite state machines, one for each CPU. These finite state machines control generation of token requests to arbiter 302. Write buffer manager 303 registers and forwards the token grant from arbiter 302 to the corresponding CPU. Upon receiving the token grant the CPU has control of the per-bank write buffer and proceeds with the write.

Datapath 304 multiplexes between data from different memory pages and forwards data to the LSMC of the CPU which won the arbitration.

Register interface 305 supports a VBUSP interface through which software can program several registers. These registers control the operation of shared memory controller 120. Signals are exported from the register interface to different blocks in LSMCs 121, 122, 123, 124, 125 and 126 and CSMC 129.

Power down controller 306 interfaces with the programmable registers through which software can request a sleep mode or wakeup of memory banks 131, 132, 133 and 134. Power down controller 306 interfaces with the power down controller 208 of each LSMC 121, 122, 123, 124, 125 and 126, and memory wrappers to put the memory banks 131, 132, 1332 and 134 into sleep mode and wakeup.

FIG. 4 is a block diagram of circuits used in this invention. In the example illustrated in FIG. 4, CPU 111 generates a memory access request including control signals and memory address. If the memory access request was for a data write, CPU 111 would further generate the data to be written into the memory (not shown). Memory bank 131 base address register 401 stores the base address of memory bank 131. This base address is supplied to comparator 402 together with the access request address from CPU 111. Comparator 402 generates a match signal if the CPU 111 request address falls within the address range of memory bank 131. This is known as a bank hit. Memory banks such as memory banks 131, 132, 133 and 134 illustrated in FIG. 1 are customarily implemented having an integral power of 2 addresses $2^N$, where N is an integer. The bank hit decision can be made by comparing the appropriate most significant address bits of the CPU 111 request address and the memory bank 131 base address.

This match decision is supplied to memory bank 131 power up controller 410. Memory bank 131 power up controller includes power bit 411. Power bit 411 is set to 1 if memory bank 131 is currently powered. Power bit 411 is reset to 0 if memory bank 131 is currently not powered. AND gate 412 receives power bit 411 at an inverting input and the match signal from comparator 402 at a non-inverting input. AND gate 412 generates a power up signal if power bit 411 signals the power down state and the match signal indicates the requested access is to memory bank 131. This power up command is one command used to power memory bank 131.

The power up command signal is also transmitted to memory access request buffer 420 as a stall signal. This stall signal is active the same time the power up signal is active, upon a memory bank hit to a powered down memory bank. In response to this stall signal, memory access request buffer 420 stores the parameters of the memory access request. As noted above this includes control signals, the memory address and optionally data for a write access. Memory access request buffer 420 further generates a CPU stall signal sent back to the requesting CPU which is CPU 111 in this example. This CPU stall signal prevents the CPU from making any further memory access requests. Memory bank power up controller 410 sets power bit 411 to 1 when memory bank 131 is powered. At this time the stall signal returns to 0. Memory access request buffer 420 is no longer stalled and the stored memory access request parameters are transmitted to the memory. At the same time memory access request buffer 420 ends the CPU stall signal. The corresponding CPU is then enabled to generate memory access requests again.

A practical system will include a memory bank base address register, comparator and memory bank power up controller as shown in FIG. 4 for each independently powered memory bank. One memory access request buffer responsive to the circuits of all memory banks is required for each CPU.

This manner of ordering powering of a memory bank does not depend upon software anticipating memory access requests. For example, a cache miss within a CPU would generate a memory access request. Anticipating such cache misses in software is a very difficult task that can be avoided using this invention. The current access is held and further accesses are stalled until the memory bank is confirmed powered.

What is claimed is:

1. A power controller in a shared memory multiprocessor system comprising:
    a memory bank base address register for each independently powerable memory bank storing a base address of a corresponding memory bank;
    a comparator for each independently powerable memory bank having a first input connected to said memory bank base address register for a corresponding memory bank, a second input receiving a processor access request memory address and an output generating a match signal if said processor access request memory address falls within an address range of said corresponding memory bank; and
    a memory bank power controller for each independently powerable memory bank powering a memory bank upon a match signal from a corresponding comparator, said memory bank power controller including
        a power bit having a first digital state when said memory bank power controller powers said corresponding memory bank and a second digital state when said memory bank power controller does not power said corresponding memory bank,
        an AND gate having a first inverting input connected to said power bit, a second non-inverting input receiving said match signal and an output, and
        said memory bank power controller signaling power up of said corresponding memory bank upon a predetermined digital output of said AND gate.

2. The memory bank power controller of claim 1, further comprising:
    a memory access request buffer for each processor in said multiprocessor system receiving memory access parameters including a request memory address and having a stall input connected to said AND gate, said memory access request buffer storing said memory access parameters upon said predetermined digital output of said AND gate.

3. The memory bank power controller of claim 2, further comprising:
    said memory access request buffer generates a processor stall signal upon said predetermined digital output of said AND gate; and
    each processor of said multiprocessor system stalls memory access requests upon receiving said stall signal from said corresponding memory access request buffer.

* * * * *